(12) United States Patent
Heo

(10) Patent No.: US 11,828,224 B1
(45) Date of Patent: Nov. 28, 2023

(54) ELECTRICAL POWER PRODUCING DEVICE

(71) Applicants: HYUNDAI MOTOR COMPANY, Seoul (KR); KIA CORPORATION, Seoul (KR)

(72) Inventor: Jin Young Heo, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/103,921

(22) Filed: Jan. 31, 2023

(30) Foreign Application Priority Data

Aug. 24, 2022 (KR) .................. 10-2022-0106483

(51) Int. Cl.
*F02C 1/05* (2006.01)
*F25J 3/06* (2006.01)

(52) U.S. Cl.
CPC ............ *F02C 1/05* (2013.01); *F25J 3/067* (2013.01); *F05D 2220/76* (2013.01); *F25J 2205/20* (2013.01); *F25J 2260/00* (2013.01)

(58) Field of Classification Search
CPC . F02C 1/05; F25J 3/067; F25J 2205/20; F25J 2260/00; F05D 2220/76
See application file for complete search history.

(56) References Cited

U.S. PATENT DOCUMENTS

| | | | | |
|---|---|---|---|---|
| 4,782,655 A | * | 11/1988 | Weber | F17C 9/04 60/260 |
| 2004/0107706 A1 | * | 6/2004 | Reese | F17C 3/10 62/45.1 |
| 2015/0354888 A1 | * | 12/2015 | Wang | F25J 3/04163 62/643 |
| 2020/0388862 A1 | * | 12/2020 | Miyazaki | H01M 8/04365 |

FOREIGN PATENT DOCUMENTS

| JP | 2005135650 A | * | 5/2005 |
|---|---|---|---|
| JP | 2005135650 A | | 5/2005 |

OTHER PUBLICATIONS

English Translation JP 2005135650 A (Year: 2005).*

* cited by examiner

*Primary Examiner* — Shafiq Mian
(74) *Attorney, Agent, or Firm* — LEMPIA SUMMERFIELD KATZ LLC

(57) ABSTRACT

A device includes a heat exchanger having one end connected to an air line through which air flows, and the other end connected to a hydrogen line through which liquid-state hydrogen flows. The heat exchanger is configured to produce liquid-state air as the air and the liquid-state hydrogen exchange heat with each other. The device also includes an air storage container connected to the heat exchanger via the air line and configured to store the liquid-state air discharged from the heat exchanger, and an evaporator connected to the air storage container via the air line and configured to evaporate the liquid-state air, supplied from the air storage (Continued)

container, through heat exchange. The device additionally includes a power generator configured to receive the air, discharged from the evaporator, via the air line, thereby producing electrical power.

13 Claims, 1 Drawing Sheet

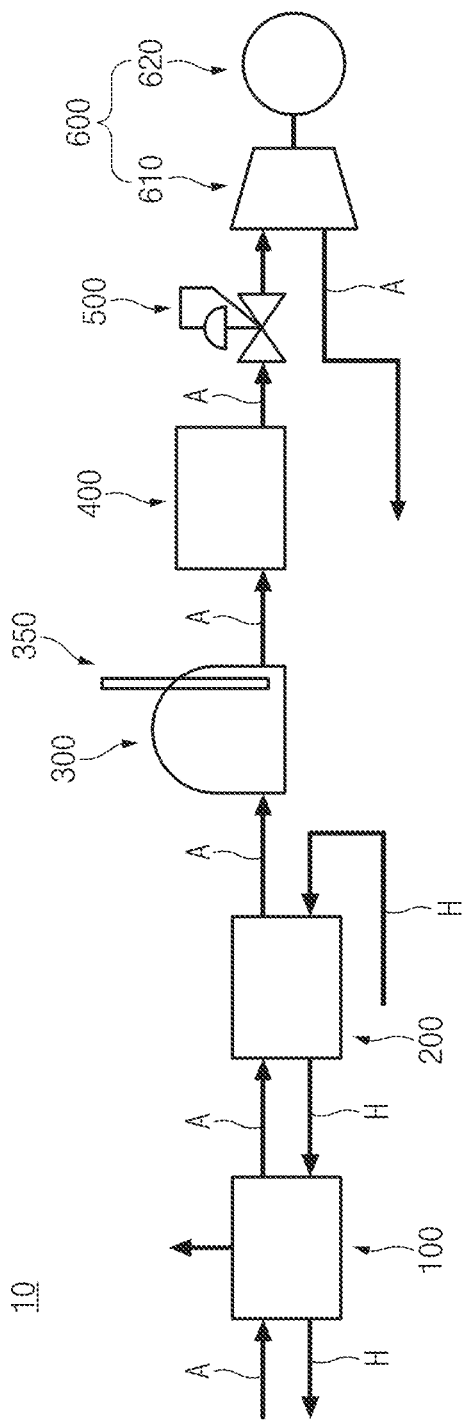

ELECTRICAL POWER PRODUCING DEVICE

CROSS-REFERENCE TO RELATED APPLICATION(S)

This application claims priority to and the benefit of Korean Patent Application No. 10-2022-0106483, filed on Aug. 24, 2022, the entire contents of which are incorporated herein by reference.

TECHNICAL FIELD

The present disclosure relates to a device and, more particularly, to a device capable of producing electrical power.

BACKGROUND

Compared to gas-state hydrogen, liquid-state hydrogen has a significantly smaller volume and is thus advantageous in terms of storage. Therefore, hydrogen is usually stored and transported in a liquid state. In order to store hydrogen in a liquid state, it is necessary to cool the hydrogen below the boiling point of hydrogen. During this process, a large amount of thermal energy is released from the hydrogen. Further, during this process, a large amount of energy is used to liquefy the hydrogen.

Also, it is necessary to evaporate the liquefied hydrogen again in order to use the hydrogen as a fuel. Typically, a large amount of cold energy is wasted during the process of evaporating the liquefied hydrogen.

SUMMARY

Example embodiments of the present disclosure provide a device capable of producing electrical power by utilizing cold energy that is generated during a process of evaporating liquid hydrogen.

According to an example embodiment of the present disclosure, a device includes a heat exchanger connected to an air line, through which air flows, and a hydrogen line, through which liquid-state hydrogen flows. The heat exchanger is configured to produce liquid-state air as the air and the liquid-state hydrogen exchange heat with each other. The device also includes an air storage container connected to the heat exchanger via the air line and configured to store the liquid-state air discharged from the heat exchanger. The device further includes an evaporator connected to the air storage container via the air line and configured to evaporate the liquid-state air, supplied from the air storage container, through heat exchange. The device additionally includes a power generator configured to receive the air, discharged from the evaporator, via the air line, thereby producing electrical power.

The device may further include a carbon dioxide separator that may be connected to the heat exchanger via the air line and the hydrogen line. The carbon dioxide separator may separate at least a portion of carbon dioxide from the air. The carbon dioxide separator may be configured such that the air and the hydrogen exchange heat with each other inside the carbon dioxide separator.

With respect to a flow direction of the air that flows through the air line, the carbon dioxide separator may be located further upstream relative to the heat exchanger.

With respect to a flow direction of the hydrogen that flows through the hydrogen line, the carbon dioxide separator may be located further downstream relative to the heat exchanger.

The hydrogen discharged from the heat exchanger may include gas-state hydrogen.

The air supplied to the heat exchanger may include gas-state air, and the air discharged from the heat exchanger may include liquid-state air.

The device may further include a regulator connected to the air line and located between the evaporator and the power generator. The regulator may adjust pressure of the air discharged from the evaporator to be within a certain range, and supply the air to the power generator.

The device may further include a liquid-state air pressurizer configured to increase pressure of the liquid-state air stored in the air storage container. The liquid-state air pressurizer may provide heat to the liquid-state air inside the air storage container to increase the pressure of the liquid-state air.

The evaporator may cause the liquid-state air to exchange heat with the atmosphere, thereby evaporating the liquid-state air.

In the heat exchanger, a direction in which the air flows may be opposite of a direction in which the liquid-state hydrogen flows.

In the carbon dioxide separator, a direction in which the air flows may be opposite of a direction in which the hydrogen flows.

The carbon dioxide separator may include a deposition pipe that may be connected to the air line and may include a flow channel configured to provide a path through which the air flows. The temperature of the hydrogen that flows in the carbon dioxide separator may be lower than the freezing point of the carbon dioxide in the air that flows in the carbon dioxide separator.

The device may further include a compressor connected to the air line and configured to pressurize the air that flows in the carbon dioxide separator.

The compressor may pressurize carbon dioxide in the air at a pressure greater than or equal to the triple point pressure of carbon dioxide.

BRIEF DESCRIPTION OF THE DRAWINGS

The accompanying drawing is included to provide a further understanding of the present disclosure and is incorporated into, and constitutes a part of, this specification. The drawing illustrates an example embodiment of the present disclosure and together with the description serves to explain the principles of the present disclosure. Other embodiments of the present disclosure and many of the intended advantages of the present disclosure should be readily appreciated by reference to the following detailed description.

FIG. 1 is a view schematically illustrating a device according to an embodiment of the present disclosure.

DETAILED DESCRIPTION

Hereinafter, embodiments of the present disclosure are described with reference to the accompanying drawing. When a component, device, element, or the like of the present disclosure is described as having a purpose or performing an operation, function, or the like, the component, device, or element should be considered herein as being "configured to" meet that purpose or perform that operation or function.

FIG. 1 is a view schematically illustrating a device 10 according to an embodiment of the present disclosure.

A device 10 according to the present disclosure is configured to recover cold energy that is generated during a process of evaporating liquid-state hydrogen, and to produce electrical power using the cold energy, thus recovering at least a portion of energy consumed when the hydrogen is liquefied.

The term "cold energy" of hydrogen as used herein may be understood as a concept of available work that may be obtained while low-temperature hydrogen exchanges heat with room temperature atmosphere and reaches thermal equilibrium, i.e., as a concept of exergy.

In the device 10 according to the present disclosure, air and hydrogen may flow in the device 10. As described in more detail below, cold energy of the hydrogen flowing in the device 10 may be transferred to the air flowing in the device 10 through heat exchange between the air and the hydrogen. The air that has received the cold energy from the hydrogen may be used as a medium for producing electrical power. Throughout the specification, a flow channel, through which the air flows, may be referred to as an air line A, and a flow channel, through which the hydrogen flows, may be referred to as a hydrogen line H.

Referring to FIG. 1, the device 10 according to the present disclosure may include a heat exchanger 200 connected to the air line A through which air flows and the hydrogen line H through which liquid-state hydrogen flows. In an example, air that is supplied to the heat exchanger 200 via the air line A may be gas-state air. In the heat exchanger 200, the gas-state air and the liquid-state hydrogen may exchange heat with each other. As the gas-state air and the liquid-state hydrogen exchange heat with each other in the heat exchanger 200, liquid-state air may be produced from the gas-state air. Also, the liquid-state hydrogen that exchanges heat with the gas-state air in the heat exchanger 200 may be evaporated and discharged from the heat exchanger 200 via the hydrogen line H. In other words, the hydrogen discharged from the heat exchanger 200 may be gas-state hydrogen.

In one example, the heat exchanger 200 may be a counterflow heat exchanger. In other words, the direction in which the air flows in the heat exchanger 200 may be opposite of the direction in which the liquid-state hydrogen flows in the heat exchanger 200. In this case, efficiency of heat exchange between the gas-state air and the liquid-state hydrogen may be maximized, and thus, the liquid-state air may be more efficiently produced. A detailed description of a configuration of a counterflow heat exchanger has not been included herein because a counterflow heat exchanger is a known component that will be readily understood by one having ordinary skill in the related art.

With continued reference to FIG. 1, the device 10 according to the present disclosure may further include a carbon dioxide separator 100. The carbon dioxide separator 100 may be connected to the heat exchanger 200 via the air line A and the hydrogen line H. The carbon dioxide separator 100 may separate at least a portion of carbon dioxide from the air flowing through the carbon dioxide separator 100. In an example, the carbon dioxide separator 100 may be configured such that the air and the hydrogen exchange heat with each other inside the carbon dioxide separator 100. In other words, as the hydrogen and the air exchange heat with each other inside the carbon dioxide separator 100, the air may be cooled. During this process, carbon dioxide in the air may be solidified and deposited inside the carbon dioxide separator 100.

In an example, with respect to a flow direction of the air that flows through the air line A, the carbon dioxide separator 100 may be located further upstream relative to the heat exchanger 200 as illustrated in FIG. 1. Therefore, the air that may flow in from the outside via the air line A may be supplied to the heat exchanger 200 via the carbon dioxide separator 100.

On the other hand, with respect to a flow direction of the hydrogen that flows through the hydrogen line H, the carbon dioxide separator 100 may be located further downstream relative to the heat exchanger 200. Therefore, the hydrogen that flows through the hydrogen line H may be supplied to the carbon dioxide separator 100 via the heat exchanger 200.

In an example, similar to the heat exchanger 200 described above, the carbon dioxide separator 100 may perform heat exchange between the air and the hydrogen in the counterflow manner. In other words, the direction in which the air flows in the carbon dioxide separator 100 may be opposite of the direction in which the gas-state hydrogen flows in the carbon dioxide separator 100. In this case, efficiency of heat exchange between the air and the gas-state hydrogen may be maximized. Thus, carbon dioxide may be more efficiently separated from the air.

As described above, the air that has exchanged heat with the liquid-state hydrogen in the heat exchanger 200 may be liquefied. Thus, liquid-state air may be discharged from the heat exchanger 200. In an embodiment, the device 10 according to the present disclosure may include an air storage container 300 connected to the heat exchanger 200 via the air line A and configured to store the liquid-state air discharged from the heat exchanger 200. The device 10 may further include an evaporator 400 connected to the air storage container 300 via the air line A and configured to evaporate the liquid-state air, supplied from the air storage container 300, through heat exchange. The device 10 may further include a power generator 600 configured to receive the air, discharged from the evaporator 400, via the air line A, thereby producing electrical power. In operation, the air that flows through the air line A may be liquefied in the heat exchanger 200 and supplied to the air storage container 300, the liquid-state air that is discharged from the air storage container 300 may be evaporated again in the evaporator 400, and the gas-state air that is discharged from the evaporator 400 may be supplied to the power generator 600 to produce electrical power.

With continued reference to FIG. 1, the device 10 according to the present disclosure may further include a regulator 500 that may be connected to the air line A and may be located between the evaporator 400 and the power generator 600. The regulator 500 may adjust pressure of the air discharged from the evaporator 400 to be within a certain range that may be required by the power generator 600, and to supply the air to the power generator 600.

The pressure of the air used by the power generator 600 to appropriately produce the electrical power may be required to be within a certain range. The pressure of the gas-state air discharged from the evaporator 400, however, may not be constant and may not necessarily be with the certain range required by the power generator 600. For example, the pressure of the gas-state air discharged from the evaporator 400 may depend on the state of the atmosphere that exchanges heat with the air in the evaporator 400, the flow rate of the air that flows in the evaporator 400, and the like. Therefore, the regulator 500 may adjust the pressure of the air discharged from the evaporator 400 to be within the certain range, required by the power generator

600, before the air is supplied to the power generator 600, thus satisfying the pressure condition required by the power generator 600.

In some embodiments, the device 10 according to the present disclosure may further include a liquid-state air pressurizer 350 that increase pressure of the liquid-state air stored in the air storage container 300. In an embodiment, the liquid-state air pressurizer 350 may provide heat to the liquid-state air stored inside the air storage container 300 to increase the pressure of the liquid-state air. In one example, the liquid-state air pressurizer 350 may include a pipe line in which a certain fluid circulates, and a valve that controls the flow of fluid that flows through the pipe line. The liquid-state air pressurizer 350 may be operated such that the fluid is supplied into the air storage container 300 via the pipe line to provide heat to the liquid-state air through heat exchange between the fluid and the liquid-state air.

With continued reference to FIG. 1, as described above, the evaporator 400 of the device 10 may be configured to produce gas-state air from liquid-state air through heat exchange. In an embodiment, the evaporator 400 may cause the liquid-state air to exchange heat with the atmosphere, thereby evaporating the liquid-state air. In one example, the evaporator 400 may include one or more fin members exposed to the atmosphere, and the liquid-state air inside the evaporator 400 and the atmosphere may indirectly exchange heat with each other through the fin members.

In some embodiments, the carbon dioxide separator 100 may include a deposition pipe (not shown) that may be connected to the air line A. The deposition pipe may include a flow channel for providing a path through which the air may flow. The air flowing through the deposition pipe may indirectly exchange heat with the low-temperature hydrogen through the deposition pipe. Also, when the temperature of the carbon dioxide in the air becomes lower than the freezing point of carbon dioxide, solid-state carbon dioxide may be produced and attached to the deposition pipe. To this end, according to the present disclosure, the temperature of the gas-state hydrogen that flows in the carbon dioxide separator 100 may be lower than the freezing point of the carbon dioxide in the air that flows in the carbon dioxide separator 100.

The separation of the carbon dioxide from the air by solidifying the carbon dioxide through the carbon dioxide separator 100 may be advantageous in at least two aspects as follows. First, extracting the carbon dioxide, which is a major factor in climate change, from the air may be advantageous from an environmental point of view. Second, the carbon dioxide is removed from the air before the air is supplied to the heat exchanger 200 in which the air exchanges heat with extremely low-temperature liquid-state hydrogen. Thus, clogging of the flow channel, which may occur when the carbon dioxide having a relatively high freezing point is solidified in the heat exchanger 200, may be prevented.

In some embodiments, the carbon dioxide separator 100 may be further provided with a separate device for vibrating the deposition pipe so that the solid carbon dioxide attached to the deposition pipe is separated from the deposition pipe and discharged to the outside.

In some embodiments, the device 10 may further include a compressor for pressurizing the air that flows in the carbon dioxide separator 100. The compressor may be provided on the air line A and may be located further upstream relative to the carbon dioxide separator 100 with respect to the flow direction of the air that flows through the air line A.

The compressor may be configured to pressurize air such that, when the carbon dioxide is separated from the air in the carbon dioxide separator 100, the carbon dioxide is separated in a liquid state. Generally, at atmospheric pressure, carbon dioxide may exist only in a gas state or solid state, but cannot exist in a liquid state. Therefore, the carbon dioxide in a liquid state cannot be separated at atmospheric pressure.

In an embodiment, when the compressor is located further upstream relative to the carbon dioxide separator 100, the pressure of the air supplied to the carbon dioxide separator 100 may be higher than the atmospheric pressure. As a result, the carbon dioxide may be liquefied during the heat exchange between the air and the hydrogen in the carbon dioxide separator 100. However, in this case, the pressure of the carbon dioxide needs to be within a range in which the carbon dioxide can exist in a liquid state. In one example, the compressor may pressurize the carbon dioxide in the air at a pressure greater than or equal to the triple point pressure of carbon dioxide to enable the separated carbon dioxide to exist in a liquid state.

Referring still to FIG. 1, the power generator 600 of the device 10 may include a turbine 610 that may be connected via the air line A to the regulator 500 and may be driven using the air supplied from the regulator 500. The power generator 600 may also include a power generating device 620. The power generating device 620 may be coupled to a rotary shaft of the turbine 610 and may be configured to covert kinetic energy of the rotary shaft into electric energy.

It is noted that although the device 10 is illustrated in FIG. 1 as including one evaporator 400, one regulator 500, and one power generator 600, in other embodiments, the device 10 may include a plurality of evaporators 400, a plurality of regulators 500, and a plurality of power generators 600 that may be arranged in series along the air line A. For example, when a device includes two evaporators 400, two regulators 500, and two power generators 600, these components may be arranged in the order of evaporator-regulator-power generator-evaporator-regulator-power generator. In this case, electrical power may be produced twice or more times along the air line A by using the air, and thus, the energy recycling rate may be increased. In at least some embodiments, the pressure of air discharged from the two different regulators and the pressure conditions required by the power generators may be different from each other.

The device 10 according to the present disclosure may recover cold energy from liquid-state hydrogen in a cryogenic (i.e., extremely low-temperature) state, and may use the cold energy to produce electrical power. Thus, energy efficiency may be enhanced in terms of exergy. Furthermore, the device 10 may generate electrical power using cold energy recovered by means of air present in an infinite amount in the atmosphere without a separate refrigerant. Thus, the device may be simplified.

According to embodiments of the present disclosure, because electrical power is produced by utilizing cold energy that is generated during the process of evaporating the liquid hydrogen, at least a portion of the cold energy of the liquid-state hydrogen may be recovered and not wasted.

While the present disclosure has been described with reference specific embodiments and the accompanying drawing, the present disclosure is not limited thereto. It should be apparent to those having ordinary skill in the art that various changes and modifications can be made without departing from the spirit and scope of the present disclosure. Accordingly, it should be noted that such alternations or modifications fall within the claims of the present disclo-

What is claimed is:

1. A device comprising:
a heat exchanger connected to an air line through which air flows and to a hydrogen line through which liquid-state hydrogen flows, the heat exchanger configured to produce liquid-state air as the air and the liquid-state hydrogen exchange heat with each other;
an air storage container connected to the heat exchanger via the air line, the air storage container configured to store the liquid-state air discharged from the heat exchanger;
an evaporator connected to the air storage container via the air line, the evaporator configured to evaporate the liquid-state air, supplied from the air storage container, through heat exchange;
a power generator configured to receive the air discharged from the evaporator, via the air line, thereby producing electrical power; and
a carbon dioxide separator connected to the heat exchanger via the air line and the hydrogen line, the carbon dioxide separator configured to separate at least a portion of carbon dioxide from the air, wherein the carbon dioxide separator is configured such that the air and the hydrogen exchange heat with each other inside the carbon dioxide separator.

2. The device of claim 1, wherein, with respect to a flow direction of the air that flows through the air line, the carbon dioxide separator is located upstream relative to the heat exchanger.

3. The device of claim 1, wherein, with respect to a flow direction of the liquid-state hydrogen that flows through the hydrogen line, the carbon dioxide separator is located downstream relative to the heat exchanger.

4. The device of claim 1, wherein, in the carbon dioxide separator, a direction in which the air flows is opposite of a direction in which the liquid-state hydrogen flows.

5. The device of claim 1, wherein the carbon dioxide separator comprises a deposition pipe connected to the air line, wherein the deposition pipe includes a flow channel configured to provide a path through which the air flows, and
wherein a temperature of the hydrogen that flows in the carbon dioxide separator is lower than the freezing point of the carbon dioxide in the air that flows in the carbon dioxide separator.

6. The device of claim 1, further comprising a compressor connected to the air line, the compressor configured to pressurize the air that flows in the carbon dioxide separator.

7. The device of claim 6, wherein the compressor is configured to pressurize carbon dioxide in the air at a pressure greater than or equal to the triple point pressure of carbon dioxide.

8. The device of claim 1, wherein the heat exchanger is further configured to discharge gas-state hydrogen.

9. The device of claim 1, wherein
the air supplied to the heat exchanger comprises gas-state air, and
the air discharged from the heat exchanger comprises liquid-state air.

10. The device of claim 1, further comprising a regulator connected to the air line and located between the evaporator and the power generator on the air line, wherein the regulator is configured to
adjust pressure of the air discharged from the evaporator to be within a particular range, and
supply the air to the power generator.

11. The device of claim 1, further comprising a liquid-state air pressurizer configured to increase pressure of the liquid-state air, stored in the air storage container by providing heat to the liquid-state air inside the air storage container.

12. The device of claim 1, wherein the evaporator is configured to cause the liquid-state air to exchange heat with the atmosphere, thereby evaporating the liquid-state air.

13. The device of claim 1, wherein, in the heat exchanger, a direction in which the air flows is opposite of a direction in which the liquid-state hydrogen flows.

* * * * *